United States Patent [19]

Kondo et al.

[11] Patent Number: 5,446,264

[45] Date of Patent: Aug. 29, 1995

[54] HONEYCOMB HEATER

[75] Inventors: Tomoharu Kondo, Toki; Fumio Abe, Handa, both of Japan

[73] Assignee: NGK Insulators, Ltd., Japan

[21] Appl. No.: 21,654

[22] Filed: Feb. 22, 1993

Related U.S. Application Data

[63] Continuation of Ser. No. 841,555, Feb. 26, 1992, abandoned.

[30] Foreign Application Priority Data

Mar. 6, 1991 [JP]   Japan .................. 3-065420

[51] Int. Cl.⁶ .......... H05B 3/10; F01N 3/10; B01D 53/36
[52] U.S. Cl. ................... 219/552; 219/205; 392/488; 60/300; 55/DIG. 30; 422/174; 422/180
[58] Field of Search ........... 392/502, 347, 379, 485, 392/486, 488, 490; 219/205–208, 541, 542, 552, 553, 505; 60/300; 422/174, 175, 177–180; 55/DIG. 30, 563

[56] References Cited

U.S. PATENT DOCUMENTS

| 1,001,654 | 8/1911 | Kratt ................... 392/485 |
| 4,245,146 | 1/1981 | Shioi et al. .............. 219/505 |
| 4,713,524 | 12/1987 | Leo et al. ............... 219/205 |
| 4,717,813 | 1/1988 | Berg et al. .............. 219/541 |
| 4,939,349 | 7/1990 | Liu . |
| 5,028,763 | 7/1991 | Chung-Tai ............. 392/379 |
| 5,063,029 | 11/1991 | Mizuno et al. .......... 422/175 |

FOREIGN PATENT DOCUMENTS

| 0042477 | 10/1980 | Japan ................. 392/379 |
| 58-23138 | 5/1983 | Japan . |
| 63-67609 | 5/1988 | Japan . |
| 1492929 | 11/1977 | United Kingdom . |
| 299036 | 10/1971 | U.S.S.R. ............... 219/541 |
| 89/10470 | 11/1989 | WIPO . |
| 89/10471 | 11/1989 | WIPO . |

OTHER PUBLICATIONS

NGK Technical Report, Honeycomb Structure BATiO₃ Ceramics for Heater Applications, Shigetaka Wada and Noboru Yamamoto, Mar. 1974.

*Primary Examiner*—Bruce A. Reynolds
*Assistant Examiner*—Michael D. Switzer
*Attorney, Agent, or Firm*—Parkhurst, Wendel & Rossi

[57] ABSTRACT

A honeycomb heater has an integrated honeycomb structure obtained by connecting in series, via conductive plates, a plurality of honeycomb structure elements each having a large number of passages and each generating heat when electrified. At least two electrodes are provided on the integrated honeycomb structure for enabling the electrical heating thereof.

12 Claims, 4 Drawing Sheets

HONEYCOMB HEATER

This is a continuation of application Ser. No. 07/841,555 filed Feb. 26, 1992, now abandoned.

BACKGROUND OF THE INVENTION

The present invention relates to a honeycomb heater comprising an integrated honeycomb structure obtained by connecting a plurality of honeycomb structure elements.

Honeycomb heaters of the above-described type can be employed as heaters for domestic use, such as hot-air heaters, or as industrial heaters, such as preheaters used for control of automobile exhaust emission.

DESCRIPTION OF THE PRIOR ART

These days, besides porous ceramic honeycomb structures conventionally employed, metal honeycomb structures are drawing attention as catalysts or catalyst carriers for removing nitrogen oxide, carbon monoxide and hydrocarbons present in the exhaust gas of internal combustion engines, such as from automobiles.

As restrictions on exhaust emissions have been intensified, there has been a demand for development of heaters for use in reducing automobile exhaust emissions when the temperature of the catalyst is not sufficiently high, i.e., at the beginning of running of a vehicle.

Honeycomb structures have been proposed in, for example, U.K. Patent 1492929 and Japanese Utility Model Laid-Open No. 67609/1988.

U.K. Patent 1492929 discloses the use of foil-type metal honeycomb structure in a catalyst for use in automobile exhaust emissions control. This honeycomb structure comprises a metal substrate produced by winding, together with a flat plate, a mechanically deformed, corrugated flat plate. This metal substrate has an aluminum oxide film formed on the surface thereof by oxidation. The catalyst for use in automobile exhaust emissions control is manufactured by placing a large surface area oxide, such as alumina, on the aluminum oxide film of the metal substrate and by impregnating a noble metal on the large surface area oxide.

Japanese Utility Model Laid-Open No. 67609/1988 discloses an electrically conductive metal monolith catalyst comprising a metal support and alumina coated thereon, for use as a preheater.

In the foil-type metal honeycomb structure disclosed in U.K. Patent 1492929, however, the metal substrate with a coating formed thereon cannot be closely adhered to a catalyst layer because of its low porosity, and a ceramic catalyst readily peels off the metal substrate due to a difference in the thermal expansion between the ceramic catalyst and the metal substrate. Furthermore, telescope phenomenon readily occurs during the run cycle in which a metal-to-metal join breaks and the metal substrate is deformed in such a manner that it protrudes in the direction of the flow of gas. This may disturb safe running of the vehicle. Furthermore, in the manufacture of the foil-type metal honeycomb, yield of the rolling process is low, inviting high production cost. In the preheater proposed in Japanese Utility Model Laid-Open No. 67609/1988, a catalyst readily peels off due to a difference in thermal expansion between alumina and the metal support. Furthermore, a metal-to-metal join of the metal substrate breaks during the operation, generating an electrically insulating portion and, hence, non-uniform flow of current and non-uniform heating.

The preheater disclosed in Japanese Utility Model Laid-Open No. 67609/1988 is constructed so that a current is supplied between the inner periphery and the outer periphery of the foil-type metal honeycomb structure to generate heat. However, the preheater is not arranged so that it has an adjusted resistance (that is, the material, dimension and rib thickness of the honeycomb structure are fixed, and a desired resistance cannot be adjusted). Therefore, this preheater exhibits an insufficient temperature raising characteristic. Furthermore, since the electrodes are provided on the inner peripheral portion of the preheater, the central portion thereof does not act as a catalyst and pressure loss may be generated. Also, the electrodes readily break due to the flow of gas.

SUMMARY OF THE INVENTION

Accordingly, an object of the present invention is to provide a honeycomb heater which eliminates the aforementioned problems of the prior devices.

According to the present invention, a honeycomb heater is provided, comprising an integrated honeycomb structure obtained by connecting, via conductive plates, a plurality of honeycomb structure elements each having a large number of passages and each generating heat when electrified, and at least two electrodes provided on the integrated honeycomb structure for enabling the electrical heating thereof.

DETAILED DESCRIPTION OF THE INVENTION

The present invention resides in a honeycomb heater comprising an integrated honeycomb structure obtained by connecting a plurality of honeycomb structure elements each having a large number of passages, via given conductive plates so as to form an electrical circuit. That is, a plurality of elements each of honeycomb structure are connected so as to form a series or parallel circuit, thereby providing resistance adjustment. The present heater which can generate controlled heat and has improved mechanical strength.

Each honeycomb structure element is preferably produced by molding raw material powders into a honeycomb shape and then sintering the shape. In this case, the use of so-called powder metallurgy and extrusion is preferable because it is economical and utilizes relatively simple steps.

Figure 5:
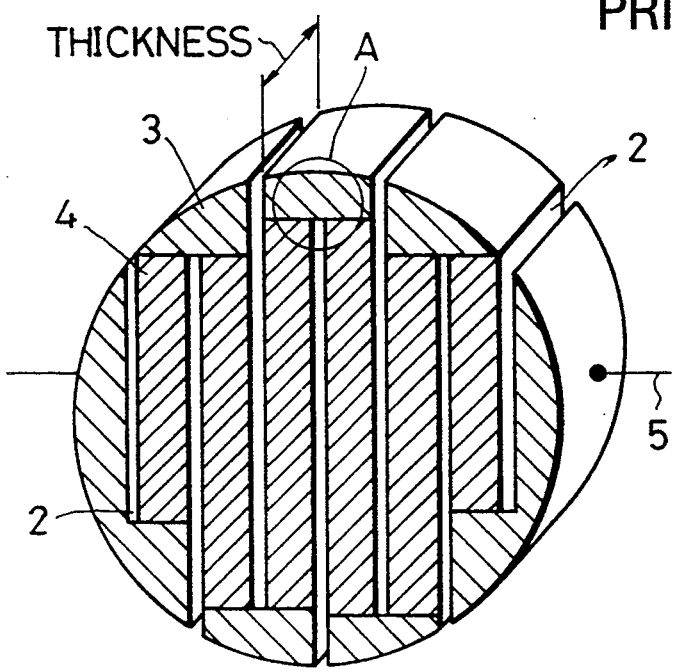
FIG. 5 is a perspective view showing an example of the resistance adjusting type heater comprising a honeycomb structure with slits as a resistance adjusting means, previously proposed by the present applicant.
Figure 6:
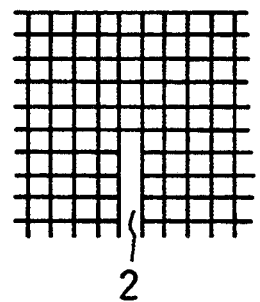
FIG. 6 is an enlarged view of the portion A of FIG. 5.

The present applicant previously proposed a heater comprising a honeycomb structure, at least two electrodes provided thereon for electrical heating thereof, and a resistance adjusting means provided between the electrodes (U.S. Pat. No. 5,063,029). In this heater, slits as a resistance adjustment means are provided in the honeycomb structure (monolithic honeycomb), whereby resistance adjustment is made between the electrodes very effectively. However, since the heat-non-generating portions 3 exist outside the slits 2 as shown in FIG. 5 and FIG. 6, the portion of the exhaust gas which passes through the heat-non-generating portions 3 undergoes purification to a lesser extent. Moreover, the formation of the slits is difficult when the heater has a curved or modified shape. Thus, the heater has had some production problems.

The honeycomb heater of the present invention has solved the above problems by connecting honeycomb structure elements via conductive plates.

By forming as above, the honeycomb heater of the present invention has no heat-non-generating portion and can be made compact. Each honeycomb structure element can be made relatively small and has good shape accuracy when produced. As necessary, the outer surface of the honeycomb structure element is subjected to a surface treatment, to obtain a honeycomb structure element of higher shape accuracy. Thus, an integrated honeycomb of excellent dimensional accuracy can be assembled. Further in the honeycomb heater of the present invention, unlike in the monolithic honeycomb, no slit is formed and variation in electrode-to-electrode resistance can be made smaller.

Figure 1:
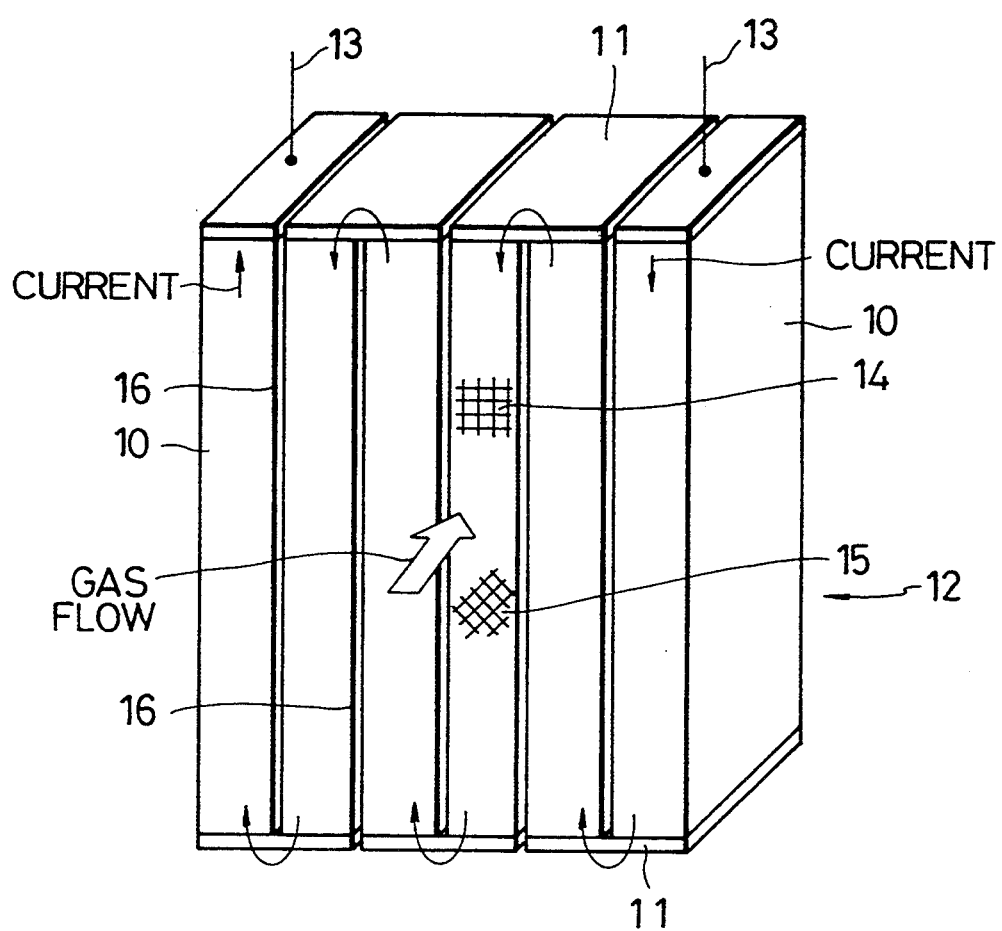
FIG. 1 is a perspective view showing an example of the honeycomb heater of the present invention.
Figure 2:
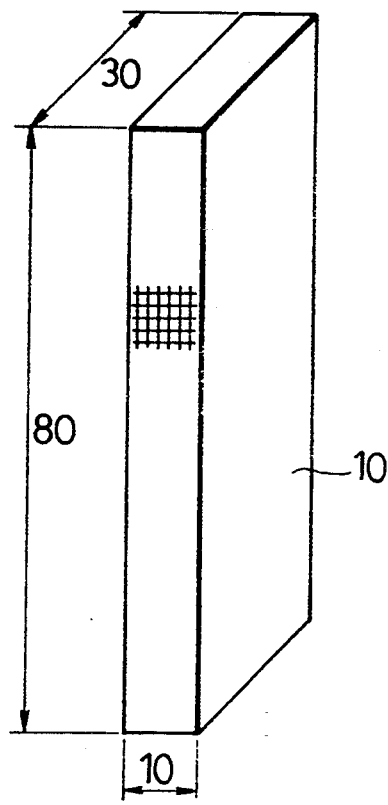
FIG. 2 is a perspective view showing an example of the honeycomb structure element used in the honeycomb heater of the present invention.

An example of the honeycomb heater of the present invention is described with reference to FIG. 1. As shown in FIG. 1, six honeycomb structure elements 10 of desired shape (a rectangular parallelepiped in FIG. 1) are connected via connecting plates 11 so as to form a series circuit, with a gap 16 smaller than the diameter of the passages of the honeycomb structure element 10, provided between each two adjacent honeycomb structure elements 10; and two electrodes 13 are provided on the two outermost plates 11. The gap 16 may not necessarily be smaller than the diameter of the passages, but is preferably smaller than the diameter to prevent the exhaust gas from blowing through the gap 16. Incidentally, in FIG. 1, the arrow mark indicates the direction of flow of electric current. The passages (cells) may be formed so that the cell walls and the plates 11 are parallel or at right angles (the cell walls and the gaps 16 are also parallel or at right angles) as shown by 14, or so that the cell walls and the plates 11 are not parallel or at right angles, but form a certain angle other than parallel or right angle as shown by 15.

Figure 4:
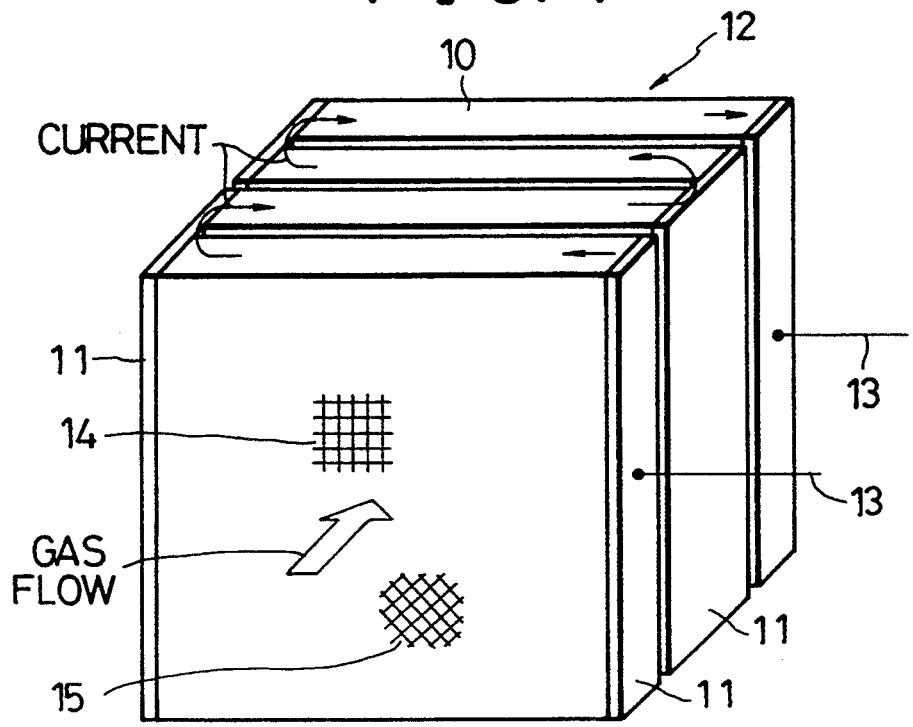
FIG. 4 is a perspective view showing other example of the honeycomb heater of the present invention.

FIG. 1 is a case in which the gaps 16 are provided parallel to the direction of gas flow, while FIG. 4 is a case in which the gaps 16 are provided at a right angle to the direction of gas flow.

The materials for the conductive plate 11 have no particular restriction, but are preferably the same as the material for the honeycomb structure element 10 because this gives an integrated honeycomb structure of higher mechanical strength and allows for easy production of the structure. The thickness of the plate is determined in view of also the materials so that the plate 11 can have, for example, an electrical resistance smaller than that of the honeycomb structure element 10. A plate thickness of 1-5 mm is ordinarily preferable in view of the mechanical strength of the integrated honeycomb structure obtained.

FIG. 1 is a honeycomb heater comprising six honeycomb structure elements connected so as to form a series circuit. It is possible that a plurality of honeycomb structure elements be connected via conductive plates and a plurality of the resulting element assemblies be connected via conductive plates. Thus, honeycomb structure elements can be combined so as to form a series or parallel circuit to produce various forms of honeycomb heaters.

The honeycomb heater of FIG. 1 has a square outer periphery. The honeycomb heater of the present invention can be produced in a desired form such as circular form, oval form or the like.

The fixation of the plate to the honeycomb structure element(s) may be conducted by known methods such as welding, brazing and the like. However, in view of mechanical strength, heat resistance and vibration resistance of the resultant heater, it is preferable to adhere to dried or sintered honeycomb structure element(s) a dried or sintered plate made of the same materials as that of said element(s) and then sinter them to obtain an integrated honeycomb structure. It is particularly preferable to adhere a dried plate to dried honeycomb structure element(s) and then sinter them, because this method provides easy steps and offers good dimensional accuracy.

In the honeycomb heater of the present invention, it is preferable to coat the surfaces of the cell walls and pores of the metallic honeycomb structure with a heat-resistant metal oxide such as $Al_2O_3$, $Cr_2O_3$ or the like, because the coating gives improved heat resistance, oxidation resistance and corrosion resistance.

Whereas any material, ceramic or metal, capable of generating heat when energized can be used as the material of the honeycomb structure element of the present invention, the use of metals enhances the mechanical strength. Examples of such metals include stainless steel and those having compositions of Fe—Cr—Al, Fe—Cr, Fe—Al Fe—Ni, W—Co, and Ni—Cr. Among the above materials, Fe—Cr—Al, Fe—Cr and Fe—Al are preferred because of their low cost and high resistance to heat, oxidation and corrosion. Foil-type metal honeycomb structures may also be employed.

The honeycomb structure element employed in the present invention may be porous or may not be porous. In the case where a catalyst is carried on the honeycomb structure element, however, a porous honeycomb structure element is preferred because it is closely adheres to the catalyst layer and does not cause peeling due to a difference in the thermal expansion between the honeycomb structure element and the catalyst.

The method of manufacturing the metal honeycomb structure element which can be employed in the present invention will now be exemplified.

First, Fe powder, Al powder and Cr powder, or alternatively powder of alloys of these metals, are mixed to prepare a metal powder material having a desired composition. Subsequently, the metal powder material is blended with an organic binder, such as methyl cellulose or polyvinylalcohol, and water to produce a readily formable mixture, and that mixture is then formed into a shape of a desired honeycomb configuration by extrusion.

When the metal powder material is blended with an organic binder and water, prior to the addition of water, an antioxidant, such as oleic acid, may be added to the metal powder material. Alternatively, metal powder which has been subjected to anti-oxidation process may be employed.

Next, the shaped honeycomb body is fired in a non-oxidizing atmosphere at a temperature between 1000° and 1400° C. During firing in a non-oxidizing atmosphere containing hydrogen, the organic binder is decomposed and thereby removed with the aid of Fe or the like which acts as a catalyst, and a good sintered body can therefore be obtained.

Sintering at a temperature lower than 1000° C. achieves no sintering. Sintering conducted at a temperature higher than 1400° C. causes deformation of the resulting sintered body.

A plurality of honeycomb structure elements thus obtained are connected each other via conductive plates to be an integrated honeycomb structure.

Preferably, a heat-resistant metal oxide is then coated on the surface of the partition walls and that of the pores of the obtained honeycomb structure by any of the following methods.

(1) The metal honeycomb structure (the sintered body) is subjected to heat-treatment in an oxidizing atmosphere at a temperature between 700° to 1200° C.

(2) Al or the like is plated (e.g., vapor plating) on the surface of the partition walls and that of the pores of the sintered body and that sintered body is then subjected to heat-treatment in an oxidizing atmosphere at a temperature between 700° and 1200° C.

(3) The sintered body is dipped into a molten metal, such as Al, and is then subjected to the heat-treatment in an oxidizing atmosphere at a temperature between 700° and 1200° C.

(4) Alumina sol or the like is coated on the surface of the partition walls and that of the pores of the sintered body and that sintered body is then subjected to heat-treatment in an oxidizing atmosphere at a temperature between 700° and 1200° C.

To enhance resistance to heat and oxidation, heat-treatment conducted at a temperature between 900° and 1150° C. is preferred.

In the case mentioned above, the sintered honeycomb structure elements are integrated into a honeycomb structure. However, it is possible to obtain an integrated honeycomb structure by connecting shaped elements before sintering via the connecting plates.

The honeycomb heater of the present invention is produced by providing electrodes on the connecting plates of the integrated honeycomb structure obtained in the manner described above by means of brazing or welding.

The resistance of the honeycomb heater will be preferably held between 0.001Ω and 0.5Ω.

Also, a heater can be produced by placing a catalyst on the surface of the obtained metal honeycomb structure. In such a heater, heat is generated due to reaction (oxidation) of the exhaust gas.

The catalyst supported on the surface of the honeycomb heater is made of a carrier having a large surface area and a catalytic-activating material supported on the carrier. Typical examples of the carriers having a large surface area include the types of $Al_2O_3$, $TiO_2$, $SiO_2$—$Al_2O_3$ and perovskite. Examples of the catalytic-activating material include noble metals, such as Pt, Pd and Rh, and base metals, such as Cu, Ni, Cr and Co. The preferred catalyst is the one in which from 10 to 100 g/ft$^3$ noble metal is loaded on the carrier made of $\gamma$-$Al_2O_3$.

Whereas the honeycomb structure element employed in the present invention may have any configuration, it is desirable that the cell density ranges from 6 to 1500 cells/in$^2$ (0.9 to 233 cells/cm$^2$) with a wall thickness ranging from 50 to 2000 μm.

As stated above, the honeycomb structure element employed in the present invention may be porous or may not be porous and may have any porosity. However, to achieve sufficient mechanical strength and resistance to oxidation and corrosion, the porosity of the honeycomb structure element will preferably be held between 0 and 50% by volume with most preferable porosity being less than 25% by volume. In the case of a honeycomb structure element designed to carry a catalyst thereon, the porosity will be held 5% or above to ensure strong adhesion between the honeycomb structure element and the catalyst layers.

The term, "honeycomb structure element" is employed in this application to refer to an integral body having a large number of passages partitioned by walls. The outer shape of the honeycomb structure element may be rectangular or elliptical as well as cylindrical. The passages may have any cross-sectional form (cell shape), e.g., a circular, polygonal or corrugated form.

The present invention is hereinafter described in more detail with reference to Example. However, the present invention is by no means restricted to the Example.

EXAMPLE

Production of sample A

A Fe powder, a Fe—Cr powder and a Fe—Al powder were compounded so as to give a composition of Fe—20Cr—5Al (% by weight). Thereto were added an organic binder (methyl cellulose), an antioxidant (oleic acid) and water to prepare a body. The body was extruded. The extrudate was dried to prepare a dried honeycomb material of 80 mm × 10 mm (cross-section) and 30 mm (thickness) having square cells of 7 mil in rib thickness at a density of 230 cells/in$^2$. The dried honeycomb material was fired a $H_2$ atmosphere to obtain honeycomb structure elements 10 each of 67 m × 8.4 mm in cross-section and 25 mm in thickness.

Figure 3:
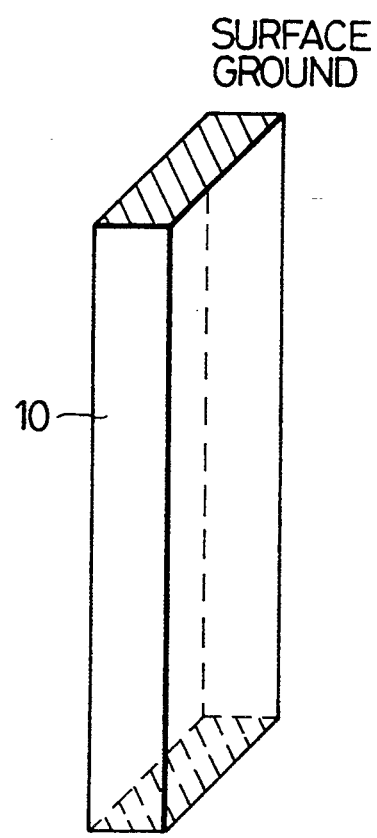
FIG. 3 is a perspective view showing an example of the honeycomb structure element used in the honeycomb heater of the present invention, in which element the two ends have been subjected to a grinding process.

Then, six of these honeycomb structure elements 10 were ground at the respective two ends as shown in FIG. 3. Then, as shown in FIG. 1, SUS 304 stainless steel plates of 2 mm in thickness as a connecting plate 11 were set on the ground ends of the honeycomb structure elements 10 with a Ni brazing material foil (BNi-3) interposed between the plate and the ground end, in such a way that the honeycomb structure elements 10 formed a series circuit. The resulting assembly was subjected to vacuum brazing at 1,100° C. for 5 minutes in a vacuum furnace to obtain a honeycomb structure 12 having a honeycomb portion of 67 mm × 47 mm × 25 mm (thickness). In the structure, the square cells were arranged so that the passage walls (cell walls) and the plates 11 were in parallel or at right angles.

Then, the honeycomb structure 12 was coated with $\gamma$-$Al_2O_3$, after which noble metals Pt and Pd were coated on the $\gamma$-$Al_2O_3$ in amounts of 30 g/ft$^3$ and 6 g/ft$^3$, respectively. The resulting honeycomb structure 12 was fired at 600° C. to obtain a honeycomb structure 12 having a catalyst supported thereon. Electrodes 13 were set on the two plates of the structure 12 to obtain a heater catalyst A.

Production of sample B

A honeycomb structure of 77 mm×47 mm×25 mm (thickness) was prepared using the same materials as for the sample A and the same shaping, drying and firing steps as for the sample A. In the honeycomb structure were formed slits so as to give the same slit system as in the sample A, whereby a honeycomb structure having the same heat-generating portion as in the sample A were obtained. The heat-non-generating portion of the honeycomb structure was sealed with an $Al_2O_3$—$SiO_2$ cement. Then, catalyst adhesion and electrode fixation were conducted in the same manner as in the sample A to obtain a heater catalyst B.

Production of sample C

Dried honeycomb materials (honeycomb structure elements) 10 of 80 mm×10 mm (cross-section) and 30 mm in thickness each having square cells of 7 mil in rib thickness at a density of 230 cells/in$^2$ were prepared using the same materials and conditions as for the sample A. Six of these honeycomb structure elements 10 and connecting plates 11 of 2.5 mm in thickness made of the same materials as for the elements 10 were adhered, as shown in FIG. 1, with an adhesive consisting of the same materials and water. The resulting assembly was subjected to the same firing step and catalyst adhesion step as in the sample A, to obtain a heater catalyst C.

Incidentally, the heater catalyst A, B and C had the same heat-generating volume (79 m$^3$) and the same electrode-to-electrode resistance (0.05Ω).

Evaluation

In order to measure mechanical strength, each of the heater catalysts A, B and C was accomodated in a casing with a spacer inserted into the gap or slit portion. Then, a high temperature vibration test was conducted, in which a vibration of 50 G and 200 Hz was continuously applied at a gas temperature of 800° C.

As a result, the heater catalyst B produced cracks at the front ends of the slits in 200 hours, while the heater catalysts A and C showed no change even after 200 hours.

Figure 7:
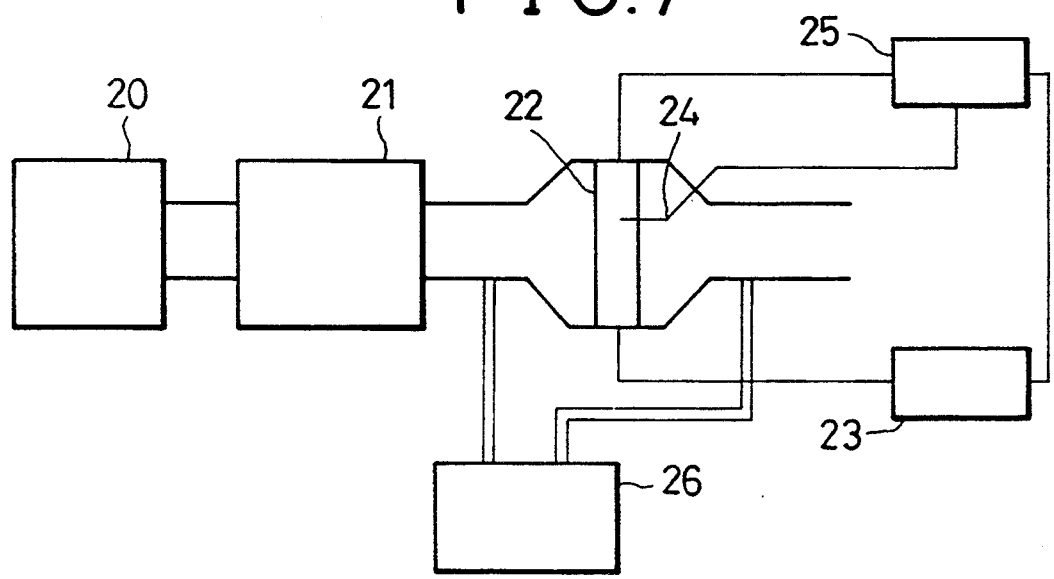
FIG. 7 illustrates the apparatus for evaluation of the performance of heater catalyst, used in the present invention.

Evaluation of the performance of each heater catalyst was conducted using an apparatus shown in FIG. 7.

Exhaust gas from a gasoline engine 20 was cooled to 120° C. by a cooler 21. The cooled gas was introduced into a heater catalyst 22. From the start of evaluation, the heater catalyst 22 was electrified for 60 seconds by a 24-V battery 23 while controlling the temperature of a thermocouple 24 provided in the heater catalyst 22, at 350° C. by a controller 25. The average conversions (%) of HC, CO and $NO_x$ during the above 60 seconds were measured by an exhaust gas analyzer 26.

In Table 1 are shown the average conversions obtained with the heater catalysts A, B and C. It is clear from Table 1 that the heater catalysts A, B and C gave about the same conversion.

TABLE 1

|  | Average conversion (%) | | |
| --- | --- | --- | --- |
|  | HC | CO | $NO_x$ |
| Heater catalyst A | 34 | 52 | 58 |
| Heater catalyst B | 33 | 50 | 57 |
| Heater catalyst C | 35 | 53 | 59 |

As described above, the present invention can provide a honeycomb heater which has excellent mechanical strengths and durability and which has no heat-non-generating portion, is compact and gives good shape accuracy and dimensional accuracy.

What is claimed is:

1. A honeycomb heater for disposal in an exhaust gas system to control exhaust-gas emissions passing therethrough, comprising:

an integrated honeycomb structure which uniformly generates heat upon electrification thereof, said integrated honeycomb structure comprising (i) a plurality of metal monolithic honeycomb structure elements arranged adjacent to each other to form a gap between adjacent honeycomb structure elements, each honeycomb structure element having opposite major surfaces, opposing side surfaces connecting said opposite major surfaces to each other, and a large number of passages defined by a plurality of uninterrupted partition walls, and (ii) connecting means for rigidly interconnecting the honeycomb structure elements with each other, said connecting means comprising conductive plates secured to adjacent side surfaces of adjacent honeycomb structure elements, said conductive plates having an electrical resistance lower than that of the honeycomb structure elements, wherein only one pair of adjacent side surfaces of two adjacent honeycomb structure elements are connected via a conductive plate such that interconnection of the honeycomb structure elements defines a circuitous current path through the integrated honeycomb structure; and at least two electrodes provided on the integrated honeycomb structure for enabling electrical heating thereof.

2. The honeycomb heater of claim 1, wherein a gap is provided between each two adjacent metal monolithic honeycomb structure elements, and the thickness of said gap as measured between adjacent metal monolithic honeycomb structure elements is smaller than the diameter of said passages.

3. The honeycomb heater of claim 2, wherein said gap extends along a plane which is parallel to the direction of gas flow through the passages.

4. The honeycomb heater of claim 2, wherein said gap extends along a plane which is perpendicular to the direction of gas flow through the passages.

5. The honeycomb heater of claim 1, wherein the conductive plates are comprised of the same materials as those of the metal monolithic honeycomb structure elements.

6. A honeycomb heater for disposal in an exhaust gas system to control exhaust-gas emissions passing therethrough, comprising:

an integrated honeycomb structure comprising first, second and third metal monolithic honeycomb elements, each of said honeycomb elements having two major opposing surfaces, first and second opposite side surfaces, and a large number of passages defined by a plurality of uninterrupted partition walls, said first, second and third honeycomb elements being sequentially arranged such that adjacent major opposing surfaces of said first and second honeycomb elements and adjacent major opposing surfaces of said second and third honeycomb elements are spaced apart from each other respectively, wherein a first conductive plate electrically connects said first side surfaces of said first and second honeycomb elements, and a second conductive plate electrically connects said second side surfaces of said second and third honeycomb elements, thereby defining a circuitous current path and providing uniform heat generation through the integrated honeycomb structure, said first and second conductive plates having an electrical resistance lower than that of said first, second and third honeycomb elements; and at least two electrodes provided on the integrated honeycomb structure for enabling electrical heating thereof.

7. The honeycomb heater of claim 6, wherein the first and second conductive plates have a thickness of 1 to 5 mm.

8. The honeycomb heater of claim 6, wherein the honeycomb heater has a resistance of $0.001\Omega$ to $0.5\Omega$.

9. The honeycomb heater of claim 6, wherein said first, second and third metal monolithic honeycomb structure elements are electrically connected to each other in series.

10. The honeycomb heater of claim 1, wherein the conductive plates have a thickness of 1 to 5 mm.

11. The honeycomb heater of claim 1, wherein the honeycomb heater has a resistance of $0.001\Omega$ to $0.5\Omega$.

12. The honeycomb heater of claim 1, wherein said metal monolithic honeycomb structure elements are electrically connected to each other in series.

* * * * *